US012781805B2

(12) United States Patent
Mick

(10) Patent No.: US 12,781,805 B2
(45) Date of Patent: Nov. 3, 2026

(54) TRIPOD ROLLER AND TRIPOD JOINT ASSEMBLY

(71) Applicant: Volkswagen Aktiengesellschaft, Wolfsburg (DE)

(72) Inventor: Alexander Mick, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 298 days.

(21) Appl. No.: 18/341,609

(22) Filed: Jun. 26, 2023

(65) Prior Publication Data

US 2023/0417290 A1 Dec. 28, 2023

(30) Foreign Application Priority Data

Jun. 27, 2022 (DE) ......................... 102022206419.4

(51) Int. Cl.

*F16D 3/205* (2006.01)
*F16C 33/66* (2006.01)
*F16D 3/202* (2006.01)

(52) U.S. Cl.

CPC ............ *F16D 3/2055* (2013.01); *F16C 33/66* (2013.01); *F16D 2003/2026* (2013.01); *F16D 2300/06* (2013.01); *Y10S 464/905* (2013.01)

(58) Field of Classification Search

CPC ........... F16D 3/2055; F16D 2003/2026; F16D 2300/06; F16C 33/66; Y10S 464/905
USPC ............................................ 464/11, 111, 132
See application file for complete search history.

(56) References Cited

U.S. PATENT DOCUMENTS

| | | | | |
|---|---|---|---|---|
| 6,328,478 B1 * | 12/2001 | Fukuda | .................. | F16C 33/58 384/475 |
| 11,802,589 B2 * | 10/2023 | Hu | ........................ | F16C 33/583 |

FOREIGN PATENT DOCUMENTS

| | | | |
|---|---|---|---|
| DE | 102009041086 A1 | | 3/2011 |
| DE | 102020212991 A1 | | 4/2022 |
| JP | 2006090515 A | * | 4/2006 |
| JP | 2006266328 A | | 10/2006 |
| JP | 2016180502 A | | 10/2016 |
| JP | 2018155377 A | | 10/2018 |
| JP | 2019124253 A | | 7/2019 |

* cited by examiner

*Primary Examiner* — Greg Binda
(74) *Attorney, Agent, or Firm* — Peter Zura; LOZA & LOZA, LLP

(57) ABSTRACT

A tripod roller for a tripod joint assembly including an outer ring with an annular running surface on its outer circumference for rolling in a tripod housing as well as an inner peripheral surface. An inner ring includes an annular running surface on its inner circumference for mounting on a pin of a tripod star and an outer circumferential surface and opposite end faces. Rolling elements may be arranged in an annular space between the inner circumferential surface of the outer ring and the outer peripheral surface of the inner ring, and via which the outer ring is rotatably mounted. Axial locking rings may be fixed to the outer ring and secure the outer ring axially relative to the inner ring. The inner ring includes recesses opening into the annular space for receiving lubricant on end faces and/or the axial locking rings via the rolling elements.

8 Claims, 8 Drawing Sheets

TRIPOD ROLLER AND TRIPOD JOINT ASSEMBLY

RELATED APPLICATIONS

The present application claims priority to German Patent App. No. DE 10 2022 206 419.4, to Alexander Mick, filed Jun. 27, 2022, the contents of which is incorporated by reference in its entirety herein.

FIELD OF TECHNOLOGY

The present disclosure relates to a tripod roller for a tripod joint assembly with the features recited in the independent claims. Furthermore, the present disclosure relates to a tripod joint with such tripod rollers.

BACKGROUND

Tripods roller comprising an outer ring with an annular running surface on its outer circumference for rolling in a tripod housing as well as an inner peripheral surface, an inner ring with an annular running surface on its inner circumference for mounting on a pin of a tripod star and an outer peripheral surface and opposite end faces, rolling elements, which are arranged in an annular space between the inner peripheral surface of the outer ring and the outer peripheral surface of the inner ring and via which the outer ring is rotatably mounted with its inner peripheral surface on the outer peripheral surface of the inner ring, and axial locking rings, which are fixed to the outer ring and secure the outer ring axially relative to the inner ring, and corresponding tripod joints are known, for example, from DE 10 2009 041 086 A1 and DE 10 2020 212 991 A1.

Such tripod rollers and tripod joints are used, for example, in side shafts on the drive side of motor vehicles. Their main functions are the transmission of torque and power from the drive to the wheel as well as the bending and length compensation during simultaneous steering and spring movements as well as unit movements.

A generic tripod roller for a tripod joint is also generally known from JP 2019-124253 A. In order to improve the lubrication of the contact between the inner ring and the pin of the tripod star, it is proposed to form lubricant pockets on the end faces of the inner ring and on the insides of the axial locking rings. The purpose of these pockets is to store lubricant for shortage situations in order to lubricate the contact surfaces between the inner peripheral surface of the inner ring and the outer peripheral surface of the pin.

In generic tripod joints, high loads occur while the vehicle is being driven, particularly in the region of the tripod rollers. In electric vehicles, this is exacerbated by increased torques and increased alternating loads that result from the recuperation.

Particularly in the case of the aforementioned double rollers with an outer ring and an inner ring and rolling elements arranged between them, there can be significant wear between the outer ring and the rolling elements and also between the inner ring and the rolling elements.

This can be remedied by a correspondingly more generous dimensioning of the components. This leads to large joint sizes, however, which should be avoided as much as possible with regard to the usually very narrow installation spaces in modern vehicles.

The use of alternative lubricants could be considered as well. Practical tests have shown, however, that it is not possible to achieve any substantial service life improvement in this manner.

SUMMARY

Against this background, aspects of the present disclosure are directed to creating tripod rollers of the aforementioned type, which have an improved service life, a compact design, and are able to withstand high loads.

Some aspects are disclosed by a tripod roller according to the independent claims. This tripod roller may be configured such that the inner ring has recesses on at least one of its end faces for receiving lubricant, with the recesses on the outer peripheral surface of the inner ring opening into the annular space in which the rolling elements are arranged in order to supply the rolling elements with lubricant.

It has been shown that the service life can be significantly improved in this manner. Despite the practical encapsulation of the annular space by the axial locking rings, the recesses achieve an improved supply of lubricant to the contact points of the rolling elements with the inner ring and the outer ring.

As a result, the use of larger joint sizes can be avoided, which also reduces weight.

The recesses can be realized without any great additional effort in terms of production technology. These recesses, can, for example, be taken into account when designing the inner ring, which is usually forged.

Special embodiments of the present disclosure are the subject of the dependent claims.

BRIEF DESCRIPTION OF THE DRAWINGS

The present disclosure is explained in more detail below using an embodiment illustrated in the drawing and further modifications. The drawing shows in.

DETAILED DESCRIPTION

Figure 1:
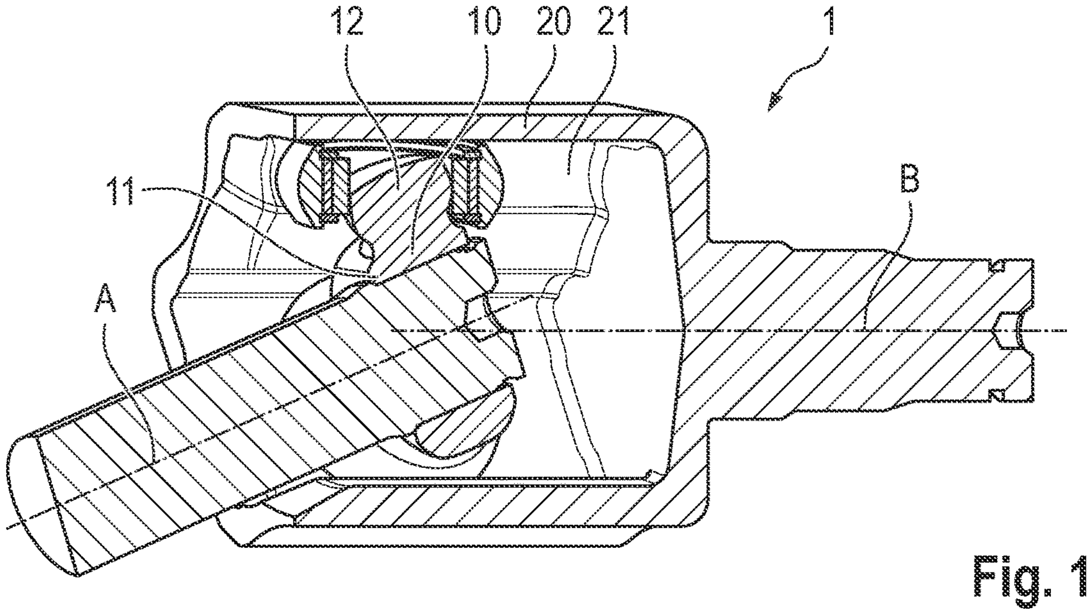
FIG. 1 illustrates a longitudinal sectional view of a tripod joint with a tripod roller according to some aspects of the present disclosure.

For a better understanding of the principles of the present disclosure, embodiments of the present disclosure will be explained in more detail below with reference to the figures. It is to be understood that the present disclosure is not limited to these embodiments and that the features described may be combined or modified without departing from the scope of the present disclosure as defined in the appended claims.

In some examples disclosed herein, the bearing length of the rolling elements in the axial direction is smaller than the length of the inner ring on its outer peripheral surface in the axial direction. In addition, the depth of the recesses on the end face at their respective opening into the annular space can be smaller than the difference between the length of the inner ring and the bearing length. As a result, the strength and acoustic properties of the tripod roller remain largely unaffected by the recesses.

If the axially opposite end faces of the inner ring are each provided with recesses, it may be advantageous to select the depth of the recesses on the end face at their respective opening into the annular space such that it is less than half the difference between the length of the inner ring and the bearing length.

In some examples, the recesses on the end face of the inner ring open into the inner peripheral surface of the inner ring, as a result of which a channel for transporting the lubricant is provided over the entire end face. The recesses on the end face of the inner ring may be configured as grooves with a constant cross-section in the longitudinal direction of the respective groove.

In some examples, the recesses on the end face of the inner ring may be deeper on the end face at their opening into the annular space than at their opening into the inner peripheral surface of the inner ring. Also, the recesses on the end face of the inner ring can be configured as grooves which are deeper at their opening into the inner peripheral surface of the inner ring than at their opening into the annular space. Furthermore, the width of the grooves may decrease from the opening into the inner peripheral surface of the inner ring to the opening into the annular space.

In some examples, the recesses on the end face of the inner ring may be configured as pockets that only open into the annular space, which means that they have no opening into the inner peripheral surface of the inner ring. The pockets preferably extend radially inwardly from the outer peripheral surface of the inner ring to only half or up to two-thirds of the inner ring thickness.

In some examples, the recesses can be designed as grooves connecting the annular space with the inner peripheral surface of the inner ring, which are curved in an arc shape in relation to a radial direction of the inner ring. Such an approximately paddle-wheel-shaped configuration leads to a rotary movement of the rollers and results in an active conveying effect of the lubricant and thus a good supply of the lubricant to the rolling elements. When a motor vehicle is being driven, the tripod rollers perform a continuous oscillating rolling motion. A relative rotating movement takes place between the outer ring and the inner ring, which results in the conveying effect. Furthermore, the curvatures of the grooves on the opposing end faces may be opposite each other. Depending on the direction of rotation, such an inverse design means that lubricant is supplied on one side and "used" lubricant is discharged or pumped out of the rolling element contact on the other side.

In some examples, recesses for accommodating lubricant are formed on the axial locking ring on an inner side facing towards the inner ring, in order to convey lubricant more effectively to the rolling elements. The recesses on the axial locking ring can, for example, include radial grooves that extend radially from an inner edge of the axial locking ring at least up to the level of the annular space. For example, these radial grooves can extend continuously over the entire end face of the axial lock or as a pocket only up to the middle or the last third of the ring height.

Furthermore, the recesses may include axial grooves on the axial locking ring, which open into the annular space and are formed obliquely or axially running on the inner edge of the axial locking ring. The radial grooves and the axial grooves may be provided together on an axial locking ring and can preferably, but not necessarily, be connected to one another.

The tripod roller may be configured for a tripod joint assembly that includes a tripod star with radially projecting pins, with a tripod roller of the type explained above being mounted on each pin, and a tripod housing with a pair of tracks for each tripod roller to guide the annular running surface of the outer ring of the respective tripod roller.

Such a tripod joint is characterized by a compact design and a long service life. It is particularly suitable for the high torques and alternating loads that occur in electric vehicle drives.

Figure 2:
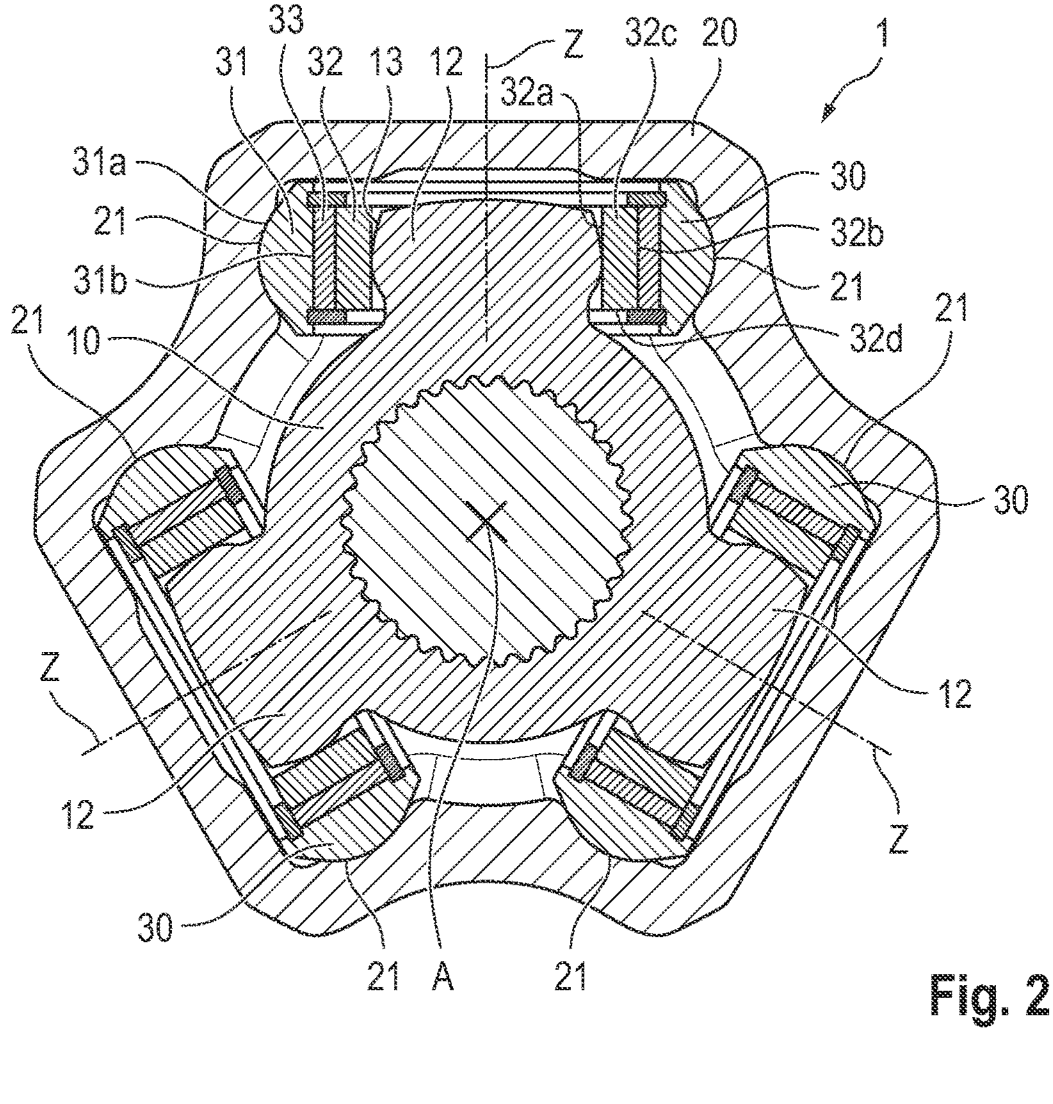
FIG. 2 illustrates a cross-sectional view of the tripod joint from FIG. 1 according to some aspects of the present disclosure.

FIGS. 1 and 2 show an example of a tripod joint assembly 1 according to the present disclosure, which can be used, for example, in a side shaft of a motor vehicle as a constant velocity joint on the drive side.

The tripod joint assembly 1 may include an inner joint part in the form of a tripod star 10 with an axis of rotation A and an outer joint part in the form of a tripod housing 20 with an axis of rotation B. Pairs of tracks 21 are formed on the inside of the outer joint part, in which the inner joint part is guided axially, i.e., in the direction of the axis of rotation B. When the tripod joint assembly 1 is extended, the axes of rotation A and B are aligned with one another. If the tripod joint assembly 1 is bent during operation, however, the axes of rotation form a bending angle that is not equal to 0°, as is shown in FIG. 1 by way of example.

The tripod star 10 may be configured with a central shaft portion 11 and a plurality of, preferably three, pins 12 protruding from the shaft portion 11. The central shaft portion 11 can be designed as a ring body that can be coupled to a shaft.

The pins 12 may be configured in the circumferential direction at the same distance from one another about the axis of rotation A of the inner joint part or tripod star 10. Their longitudinal axes Z run substantially radially to the axis of rotation A and preferably lie in a common plane, as shown in the embodiment illustrated in FIG. 2.

Furthermore, the tripod joint assembly 1 may include a tripod roller 30 on the tripod star 10 for each pin 12 that is rotatably mounted on the associated pin 12 of the tripod star 10 about the longitudinal axis Z of the pin 12.

In some examples, the pins 12 each have a profiled surface 13 for mounting the tripod rollers 30, which is explained in more detail below.

Each tripod roller 30 may include an outer ring 31 and an inner ring 32 as well as rolling elements 33 arranged between them, so that the outer ring 31 and the inner ring 32 can be rotated in relation to one another.

The outer ring 31 and the inner ring 32 are preferably designed as rotationally symmetrical components.

For example, the outer ring 31 has an annular running surface 31*a* on its outer circumference for rolling on a pair of tracks 21 of the tripod housing 20, and also an inner peripheral surface 31*b*.

On its inner circumference, the inner ring 32 has an annular running surface 32*a* to be placed on the pin 12 of the tripod star 10, as well as an outer circumferential surface 32*b* and opposite end faces 32*c* and 32*d*.

The rolling elements 33, which are preferably designed as needles or rollers, are arranged in an annular space 34 between the inner peripheral surface 31*b* of the outer ring 31 and the outer peripheral surface 32*b* of the inner ring 32. The annular space 34 extends around the pin 12. The inner peripheral surface 31*b* of the outer ring 31 is rotatably mounted on the outer peripheral surface 32*b* of the inner ring 32 via the rolling elements 33. Preferably, the rolling elements 33 each have a line contact with the inner peripheral surface 31*b* of the outer ring 31 and with the outer peripheral surface 32*b* of the inner ring 32.

Furthermore, axial locking rings 40 are provided, which are fixed to the outer ring 31 and which axially secure the outer ring 31 relative to the inner ring 32. The axial locking rings 40 are radially slotted for assembly and have, for example, a rectangular cross section. They are fitted into corresponding grooves on the inner peripheral surface 31*b* of the outer ring 31.

In some examples, annular space 34 is closed by the inner sides 40*a* of the axial locking rings 40 arranged axially on both sides of the annular space 34. The axial locking rings 40 also ensure that the rolling elements 33 cannot migrate sideways out of the annular space 34.

As shown in the examples of FIGS. 4, 6, 8, 10, 12, 14 and 16, the rolling elements 33 have convex end sections 33*a* at their axial ends.

As a result, the contact length $l_W$ of the rolling elements 33 is smaller in the axial direction than the length $l_{IR}$ of the inner ring 32 on its outer peripheral surface 32*b* in the axial direction.

Each tripod roller 30 can roll with the annular running surface 31*a* of its outer ring 31 along a pair of tracks 21 of the outer joint part or tripod housing 20. For this purpose, the profile of the ring-shaped running surface 31*a* can be convexly curved outwards in the cross-section. The tracks of the pair of tracks 21 can correspondingly have a concave cross-sectional profile, as can be seen in FIG. 2. The inner ring 32 with its inner peripheral surface 32*a* is in contact with the associated pin 12 of the tripod star 10. The inner peripheral surface 32*a* of the inner ring 32 can be circularly cylindrical. For the purposes of this disclosure, inner and outer perimeters are understood to be the relevant surfaces and not dimensions. The profiled surface 13 of the pin 12 can be configured in a convex shape in a longitudinal section plane that comprises the longitudinal axis Z of the respective pin 12.

Due to the convex configuration of the surface 13 of the pin 12 with which the inner peripheral surface 32*a* of the inner ring 32 is in contact, the inner ring 32 can be tilted relative to the longitudinal axis Z of the associated pin 12 when the tripod joint assembly 1 is tilted. In addition, there is an axial displaceability in the direction of the longitudinal axis Z of the pin 12.

The functions of the rotation about the pins 12, the tilting as well as the axial displacement can also be realized in other ways. The embodiment of a rotatable bearing in a plurality of directions shown in FIGS. 1 and 2 to facilitate a wobbling movement represents only one possibility for a tripod roller 30, which is provided for the purpose of illustrating the function of such a roller.

The outer joint part or tripod housing 20 has its own engagement portion for each tripod roller 30. The engagement portion is designed, for example, like a sleeve and can have a constant cross-sectional profile over its axial length.

In the embodiment illustrated in FIGS. 1 and 2, the engagement portion has, on its inner circumference, pairs of tracks 21 running parallel to the axis of rotation B of the tripod housing 20, with the tracks lying opposite one another in the circumferential direction. These tracks are in engagement with the running surface 31*a* on the outer circumference of the respective tripod roller 30, with one of the tracks 21 on the tripod housing 20 being load-bearing and the opposite track being relieved, depending on the direction of rotation and the operating situation. The tracks 21 on the tripod housing 20 preferably each run parallel to the axis of rotation B of the tripod housing 20.

The profiling of both the tracks 21 on the tripod housing 20 and the annular running surfaces 31*a* of the outer rings 31 of the tripod rollers 30 have the effect that, when the joint 1 rotates and the component axes A and B bend towards one another, the tripod rollers 30 are moved back and forth parallel to the axis of rotation B of the tripod housing 20. As has already been explained above, the degree of pivoting freedom required for this can be provided, for example, between the pins 12 and the inner rings 32 of the tripod rollers 30.

To improve the service life of the tripod rollers 30, as shown in FIGS. 3 to 10 by way of example, the inner ring 32 has recesses 35 on at least one of its end faces 32*c*, 32*d* for receiving lubricant. The recesses 35 in the end faces 32*c*, 32*d* are configured in such a way that they open into the annular space 34 in which the rolling elements 33 are arranged in order to supply the rolling elements 33 with lubricant.

In further variants, as shown by way of example in FIGS. 11 to 16, at least one of the axial locking rings 40 can have recesses 41 for receiving lubricant, with the recesses 41 in turn opening into the annular space 34 in which the rolling elements 33 are arranged in order to supply rolling elements 33 with lubricant.

Both measures, namely recesses 35 on the inner ring side and recesses 41 on the axial locking ring side, can be combined with one another. In the present case, the recesses 35 and 41 are preferably depressions in the respective surfaces 32*c*, 32*d* and 40*a* and 43.

Particularly suitable embodiment variants in this respect will be explained in more detail below, without the present disclosure being restricted to these specific variants. In particular, combinations of the following design variants can also be implemented, so that recesses 35 or 41 of different design variants are provided on an inner ring 32 and/or an axial locking ring 40.

Figure 3:
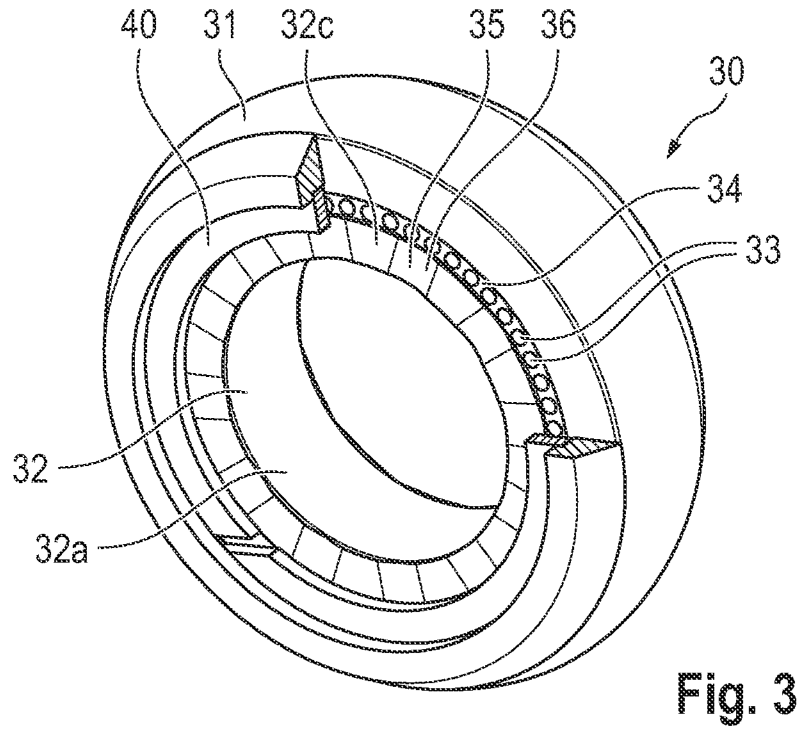
FIG. 3 illustrates a spatial view of a first embodiment variant of a tripod roller according to some aspects of the present disclosure.
Figure 4:
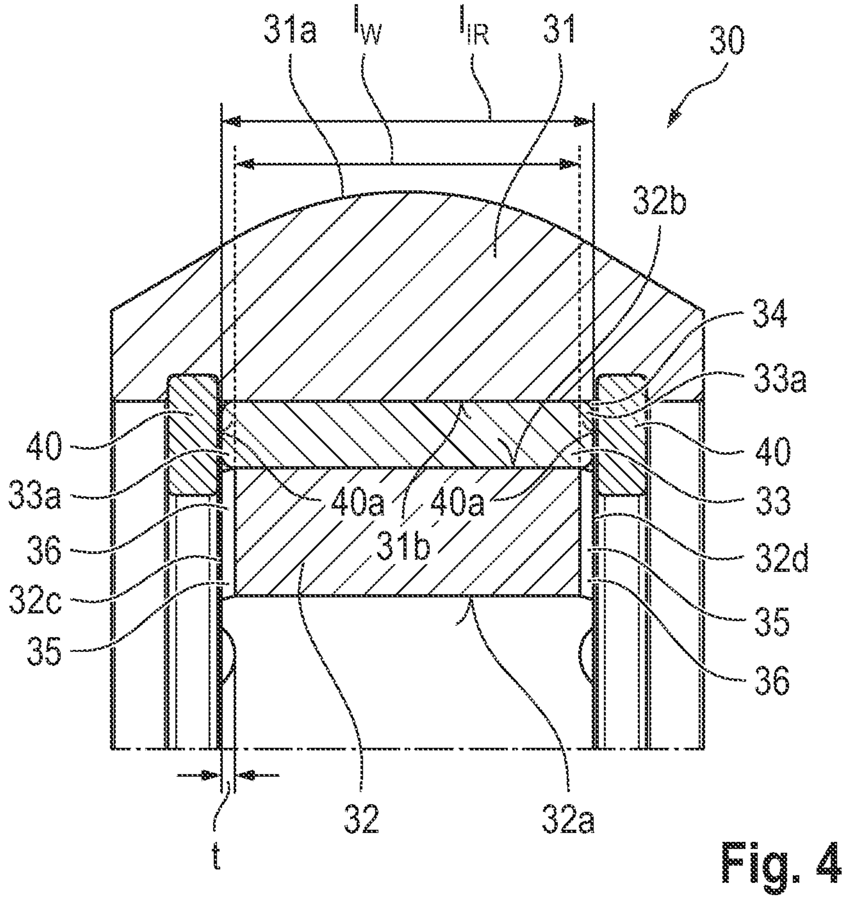
FIG. 4 illustrates a half-sectional view of the tripod roller from FIG. 3 according to some aspects of the present disclosure.

FIGS. 3 and 4 show a first variant with recesses 35 on the end faces 32*c* and 32*d* of the inner ring 32. The recesses 35 are designed as grooves 36 with a cross section that is preferably constant in the longitudinal direction of the respective groove 36. These grooves 36 not only open into the annular space 34, i.e., not only intersect the outer peripheral surface 32*b* of the inner ring 32, but also open into the inner peripheral surface 32*a* of the inner ring 32 and thus intersect said surface. This way, lubricant can reach the otherwise enclosed annular space 34 from the outside via the recesses 35 or grooves 36 in order to lubricate the rolling elements 33.

As can be seen in particular from FIG. 4, the recesses 35 are preferably provided on both axial end faces 32*c*, 32*d*. The contact length $l_W$ of the rolling elements 33 is preferably selected to be smaller in the axial direction than the length $l_{IR}$ of the inner ring 32 on its outer peripheral surface 32*b* in the axial direction. In addition, the depression t of the recesses 35 in the end face 32*c*, 32*d* at their respective opening into the annular space 34 is preferably selected to be less than half the difference between the length $l_{IR}$ of the inner ring 32 and the bearing length $l_W$.

As a modification of this, the depression t of the recesses 35 in the end face 32*c*, 32*d* at their respective opening into the annular space 34 can also be selected, particularly if only one end face 32*c*, 32*d* is to be provided with recesses 35, but also in general, such that it is smaller than the difference between the length $l_{IR}$ of the inner ring 32 and the bearing length $l_W$.

It is also possible to make the depressions t of the recesses 35 even deeper than mentioned above and to thereby accept a locally reduced contact length between the inner ring 32 and the rolling elements 33. The effective bearing length $l_W$ of the rolling elements 33 is restricted by the deeper depression. This is acceptable as long as, in terms of the service life, the advantage of an improved supply of lubricant outweighs the disadvantage of the reduced bearing length.

Figure 5:
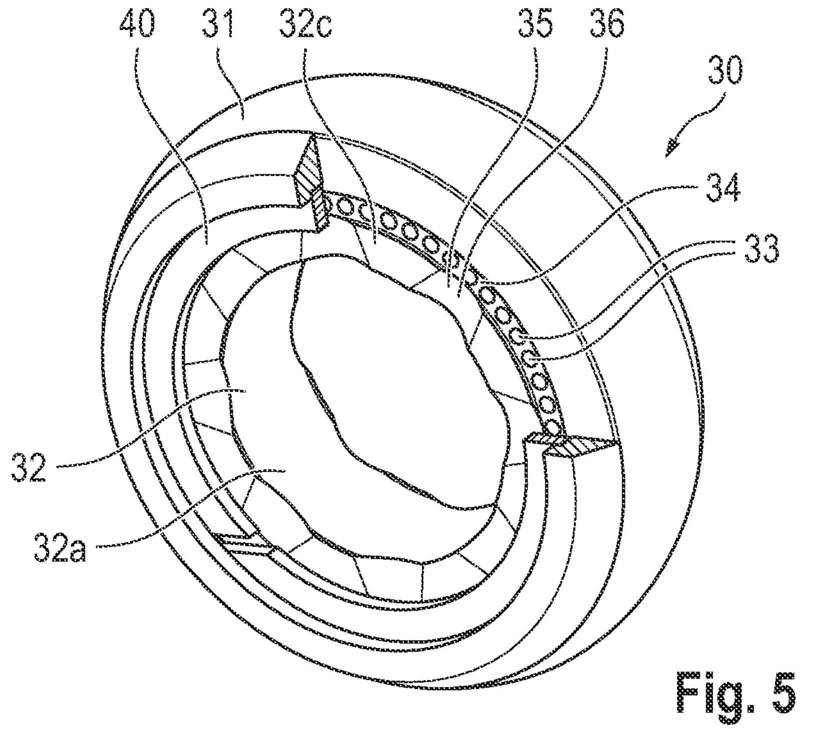
FIG. 5 illustrates a spatial view of a second embodiment variant of a tripod roller according to some aspects of the present disclosure.
Figure 6:
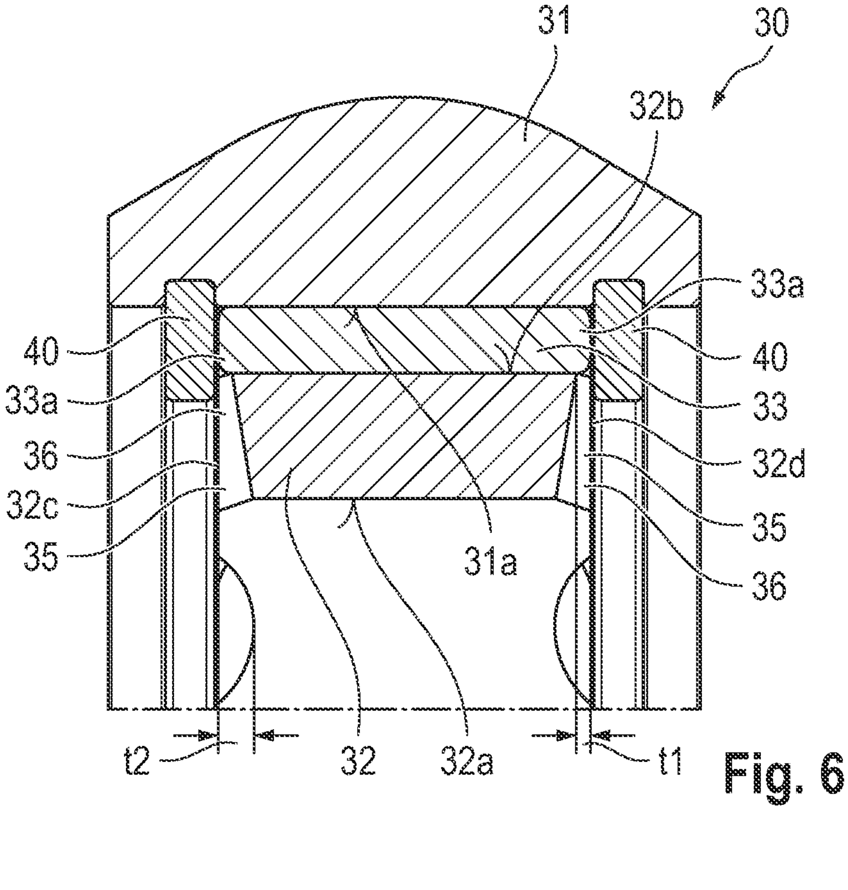
FIG. 6 illustrates a half-sectional view of the tripod roller from FIG. 5 according to some aspects of the present disclosure.

FIGS. 5 and 6 show a second embodiment variant with recesses 35 on the end faces 32*c* and 32*d* of the inner ring 32. The recesses 35 are designed once again as grooves 36 which, however, in comparison to the embodiment variant in FIGS. 3 and 4, do not run parallel to the plane of the respective end faces 32*c* and 32*d*, but are beveled instead. Suitable bevel angles to the plane are in the range from 5 to 20°.

The recesses 35 can, for example, be deeper at their opening into the inner peripheral surface 32*a* of the inner ring 32 than at their opening into the annular space 34. As can be seen in particular in FIG. 6, the depression $t_2$ at the opening into the inner peripheral surface 32*a* is larger than the depression $t_1$ at the opening into the annular space 34.

In a modification of this, the recesses 35 on the end face 32*c*, 32*d* of the inner ring 32 can be deeper on the end face 32*c*, 32*d* at their opening into the annular space 34 than at their opening into the inner peripheral surface 32*a* of the inner ring 32. In this case, $t_1$ is greater than $t_2$.

In addition, as can be seen in particular from FIG. 5, the width of the grooves 36 can decrease from the opening into the inner peripheral surface 32*a* of the inner ring 32 to the opening into the annular space 34.

These two measures—different depths on the one hand and different width on the other—can be implemented in combination, but also independently of one another.

Figure 7:
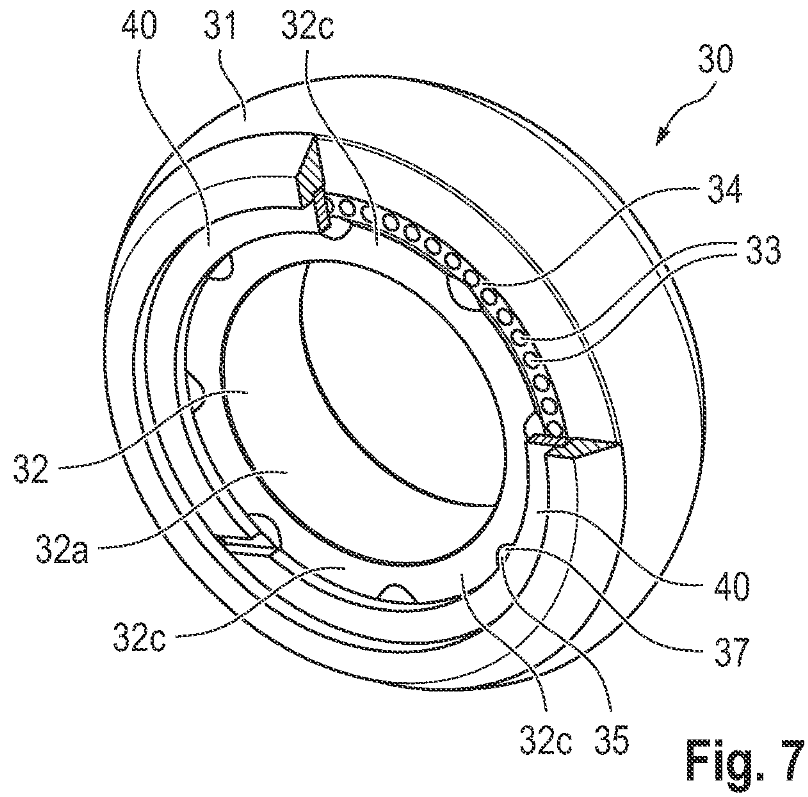
FIG. 7 illustrates a spatial view of a third embodiment variant of a tripod roller according to some aspects of the present disclosure.
Figure 8:
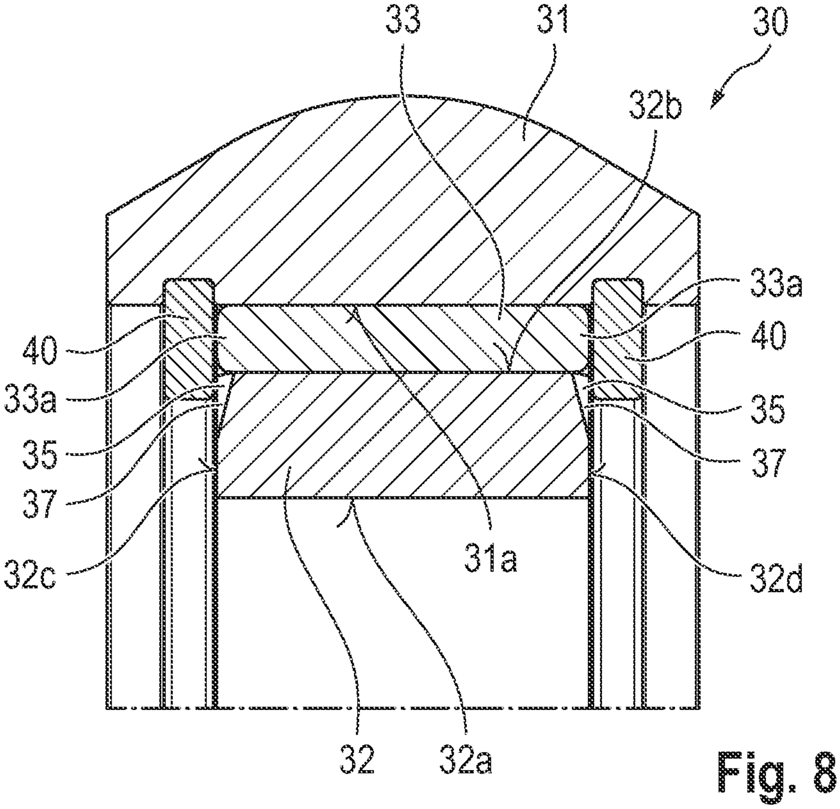
FIG. 8 illustrates a half-sectional view of the tripod roller from FIG. 7 according to some aspects of the present disclosure.

Another design feature for the recesses 35 is shown in FIGS. 7 and 8 by using a third embodiment variant as an example. In this case, the recesses 35 are formed by pockets 37 in the end face 32*c*, 32*d* for receiving lubricant. The pockets 37 only open into the annular space 34, but do not intersect the inner peripheral surface 32*a* of the inner ring 32, but end radially inward on the respective end surface 32*c*, 32*d*. They are preferably designed in such a way that lubricant can be transported from the outside into the annular space 34. For this purpose, the pockets 37 preferably extend further radially inwards than the axial locking rings 40.

Figure 9:
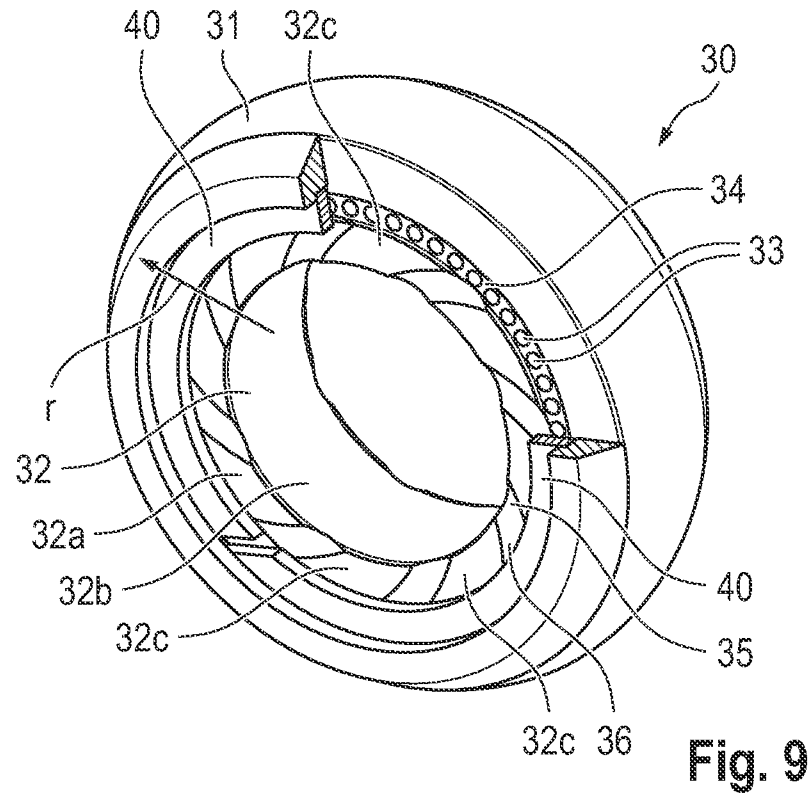
FIG. 9 illustrates a spatial view of a fourth embodiment variant of a tripod roller according to some aspects of the present disclosure.
Figure 10:
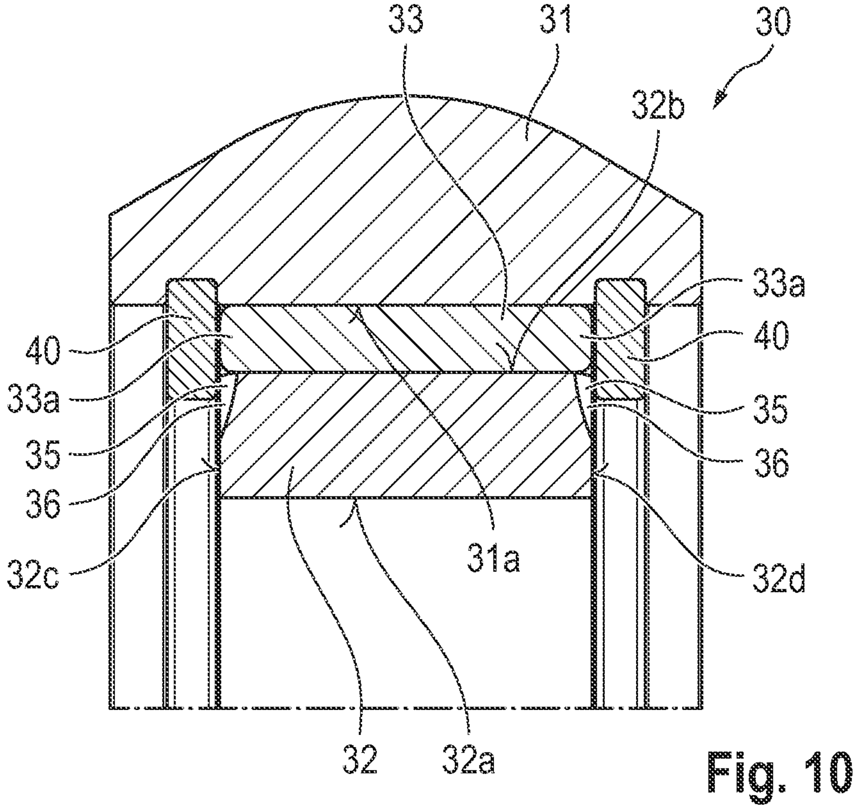
FIG. 10 illustrates a half-sectional view of the tripod roller from FIG. 9 according to some aspects of the present disclosure.

FIGS. 9 and 10 show a further design feature within the scope of a fourth embodiment variant, which can be combined with the design features for the recesses 35 explained above.

As can be seen in FIG. 9, the recesses 35 of the end faces 32*c*, 32*d* can be designed as grooves 36 connecting the annular space 34 with the inner peripheral surface 32*a* of the inner ring 32, which are curved in an arc to a radial direction r of the inner ring 32. The curvature occurs in the plane of the respective end face 32*c*, 32*d*.

In the viewing direction perpendicular to the end face 32*c*, the recesses 35 are designed in the shape of a paddle wheel. When the tripod rollers 30 rotate, this causes an active conveying effect for the lubricant. Since the tripod rollers 30 perform a continuous oscillating rolling movement when the vehicle is being driven, there is a constant relative rotating movement between the outer ring 31 and the inner ring 32, which facilitates the conveying effect for the lubricant so that lubricant can be introduced into the annular space 34 from the outside.

If the paddle-wheel-shaped recesses 35 are designed in opposite directions on an inner ring 32 on the two opposite axial end faces 32*c* and 32*d*, one side supplies lubricant and the other side removes lubricant, depending on the direction of rotation. This allows for a very good supply of lubricant to the rolling elements 32 and their contact points with the outer ring 31 and the inner ring 32.

As already mentioned, the configuration of the grooves 36, which are shown in FIGS. 9 and 10 with a constant cross-section, and merely as an example, can be modified in accordance with the embodiment variants explained above.

It is also possible, as a modification of the illustration in FIG. 9, to also provide grooves curved in opposite directions on the same end face 32*c* or 32*d*.

Figure 11:
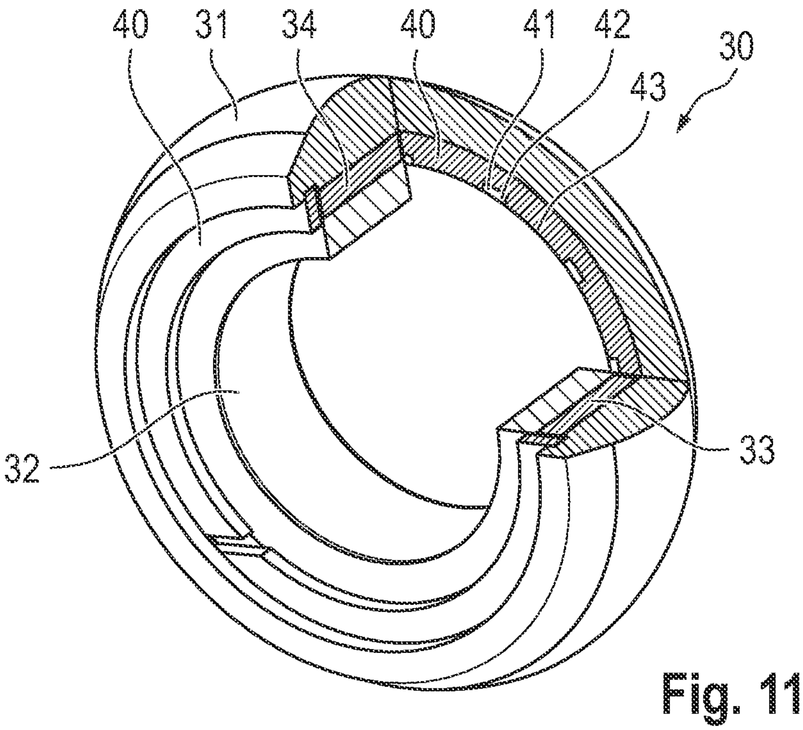
FIG. 11 illustrates a spatial view of a fifth embodiment variant of a tripod roller to illustrate recesses for accommodating lubricant on the axial locking ring according to some aspects of the present disclosure.
Figure 12:
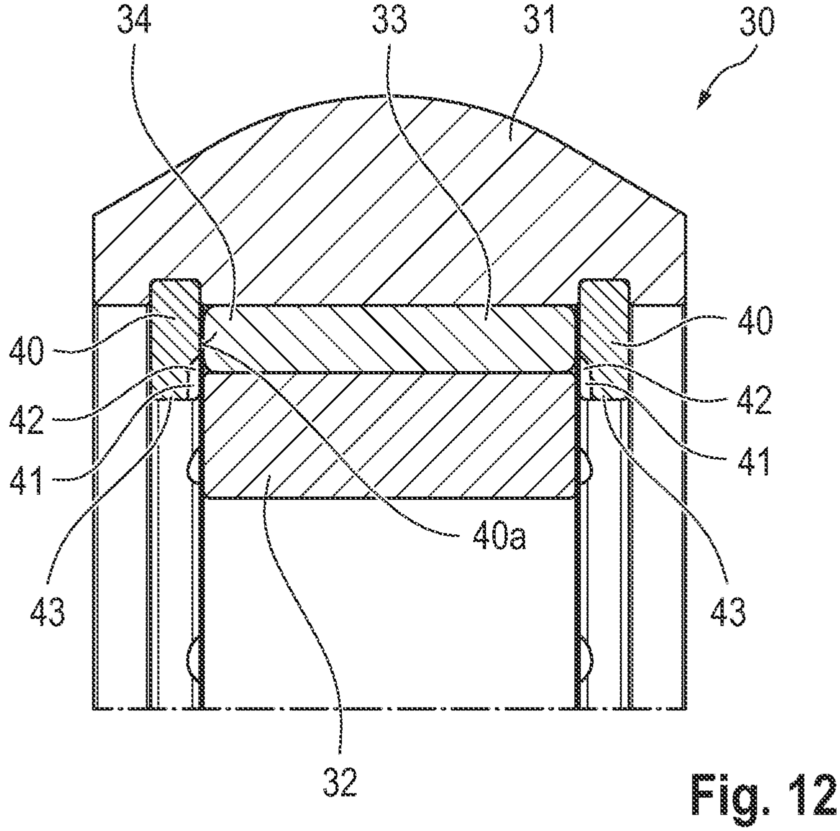
FIG. 12 illustrates a half-sectional view of the tripod roller from FIG. 11 according to some aspects of the present disclosure.

FIGS. 11 and 12 show a fifth embodiment variant for improving the supply of lubricant, in which 41 are provided on the axial locking ring 40 for the transport of lubricant.

In the fifth embodiment variant, these recesses 41 are formed on a side 40*a* of the axial locking ring 40 pointing toward the inner ring 32 in order to effectively convey lubricant to the rolling elements 33.

In the present case, these recesses 41 on the axial locking ring 40 comprise radial grooves 42 which extend radially from an inner edge 43 of the axial locking ring 40 at least up to the level of the annular space 34.

In FIGS. 11 and 12, the radial grooves 42 preferably extend from the inner edge 43 to the middle or the last third of the ring height of the axial locking ring 40 in the radial direction.

Figure 13:
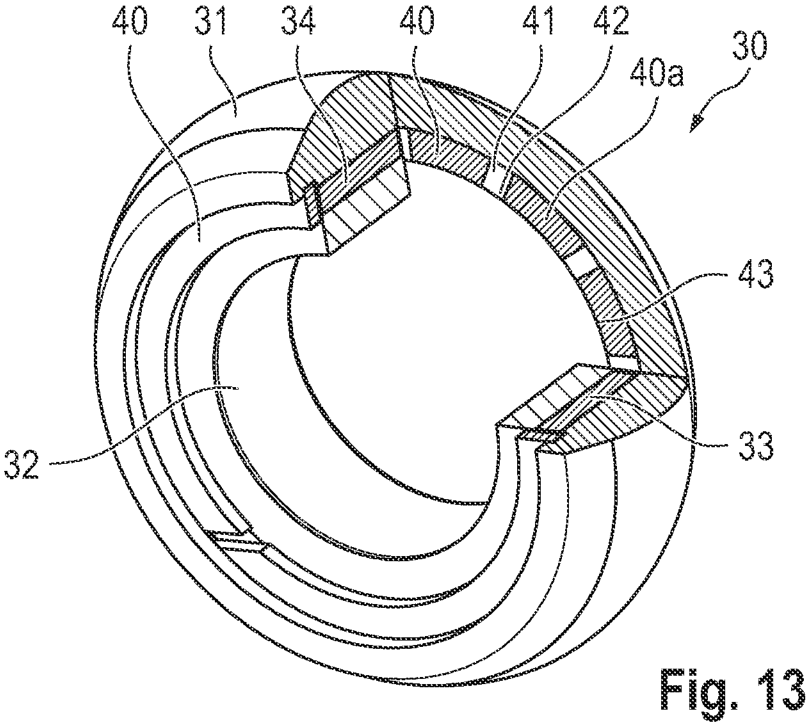
FIG. 13 illustrates a spatial view of a sixth embodiment variant of a tripod roller to illustrate further recesses for accommodating lubricant on the axial locking ring according to some aspects of the present disclosure.
Figure 14:
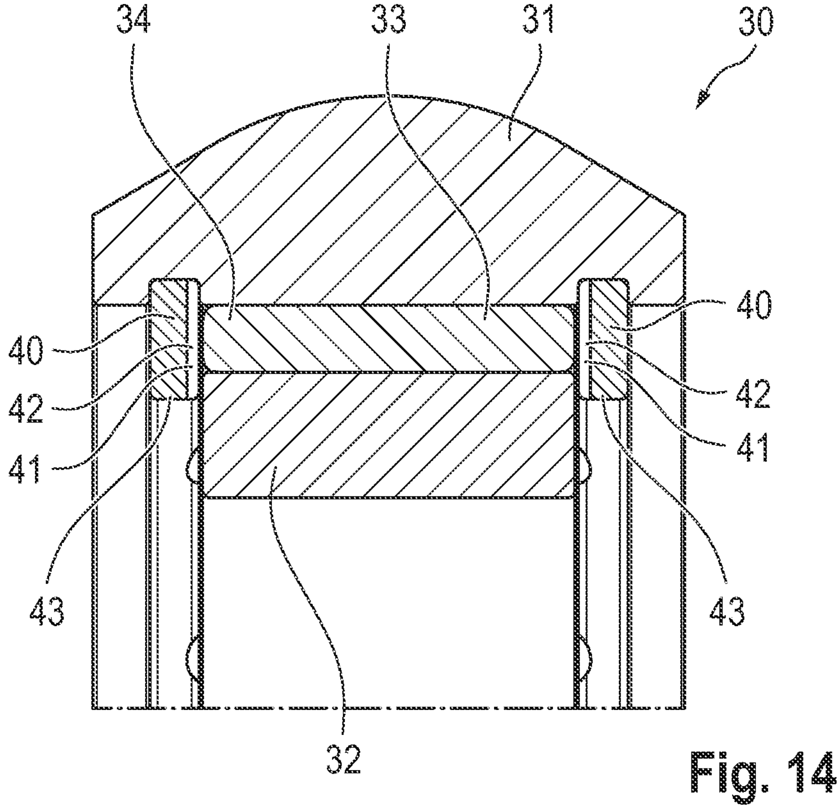
FIG. 14 illustrates a half-sectional view of the tripod roller from FIG. 13 according to some aspects of the present disclosure.

However, it is also possible, as shown in a sixth embodiment variant in FIGS. 13 and 14, that radial grooves 42 extend continuously over the entire inner side 40*a* of the respective axial locking ring 40 facing the inner ring 32 and the annular space 34.

Figure 15:
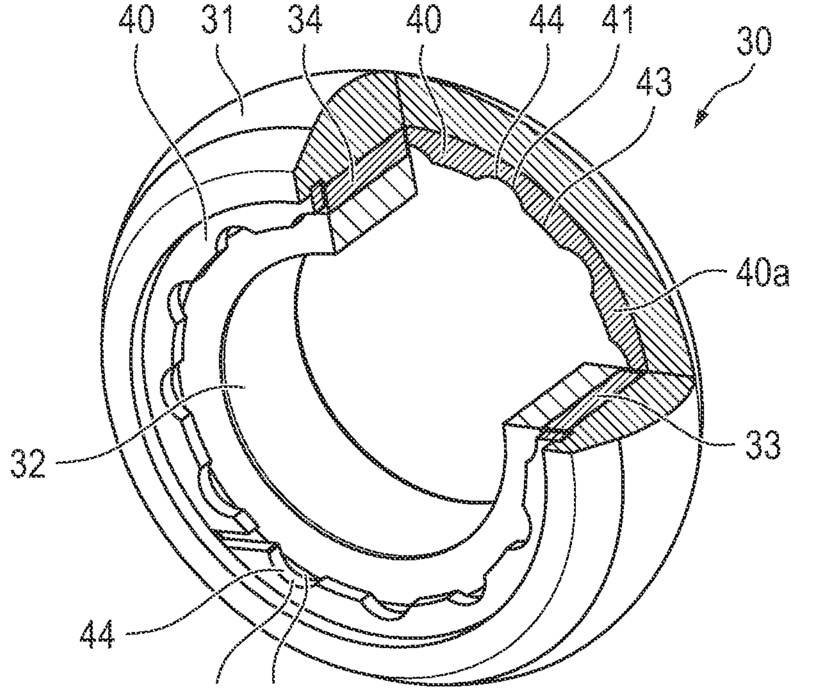
FIG. 15 illustrates a spatial view of a seventh embodiment variant of a tripod roller to illustrate further recesses for accommodating lubricant on the axial locking ring, according to some aspects of the present disclosure.
Figure 16:
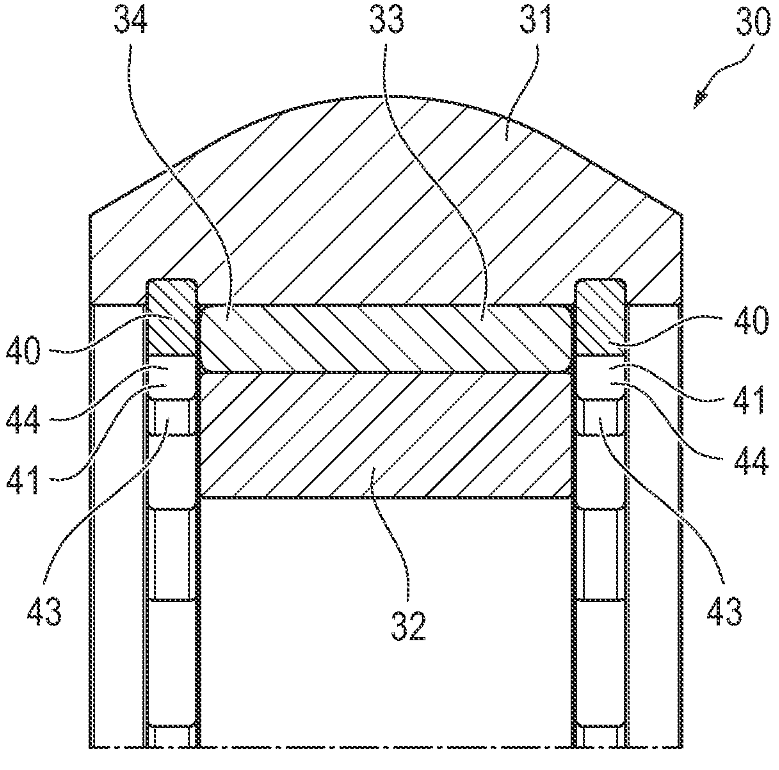
FIG. 16 illustrates a half-sectional view of the tripod roller from FIG. 15 according to some aspects of the present disclosure.

Furthermore, the recesses 41 on the axial locking ring 40 can comprise axial grooves 44, as shown in a seventh embodiment variant in FIGS. 15 and 16. These axial grooves 44 are cut into the inner edge 43 of the axial locking ring 40 in such a way that they open into the annular space 34 for the purpose of an external lubricant supply. The axial grooves 44 can preferably run axially, i.e., parallel to the central longitudinal axis of the axial locking ring 40, on the inner edge 43 of the axial locking ring 40. However, it is also possible to position them somewhat obliquely in relation to such an axial course, for example in an angle range of up to 30°.

The radial grooves 42 and the axial grooves 44 can be provided together on an axial locking ring 40. In this case, these can optionally be connected to one another. However, it is also possible to arrange them unconnectedly next to one another.

It has been shown that the above-described modifications to the tripod roller 30 can improve the service life of a tripod joint assembly 1 in a surprisingly significant way without increasing the weight of the component or the external dimensions. This way, compact tripod joints 1 with high loads can be realized.

Due to the improved service life properties, the tripod joints explained above are particularly suitable for motor vehicles with an electric drive and comparable drive conditions with high torques and strong alternating loads. The strength and acoustic properties of the tripod rollers 30 remain unaffected.

The modification according to the present disclosure can also be realized without undue additional technical effort.

The formation of recesses 35 on the inner ring 32, for example, can be integrated into a forging process. In this case, the additional manufacturing effort remains minimal, since only the forging tool has to be adapted.

The formation of additional recesses 41 on the axial locking ring 40 can be realized very easily with an additional step in the stamping process for the axial locking ring 40.

The present disclosure was explained in more detail above using an exemplary embodiment and further modifications. In particular, individual technical features that have been explained above in the context of other individual features can be realized independently of these and in combination with other individual features, even if this is not expressly described, as long as it is technically possible to do so. The present disclosure is therefore expressly not limited to the exemplary embodiments and modifications described, but rather includes all configurations defined by the claims.

| List of reference signs | |
|---|---|
| 1 | Tripod joint |
| 10 | Tripod star (inner joint part) |
| 11 | Shaft portion |
| 12 | Pin |
| 13 | Pin surface |
| 20 | Tripod housing (outer joint part) |

-continued

| List of reference signs | |
|---|---|
| 21 | Track |
| 30 | Tripod roller |
| 31 | Outer ring |
| 31a | Running surface/outer peripheral surface of the outer ring |
| 31b | Inner peripheral surface of the outer ring |
| 32 | Inner ring |
| 32a | Running surface/inner peripheral surface of the inner ring |
| 32b | Outer peripheral surface of the inner ring |
| 32c | End face of the inner ring |
| 32d | End face of the inner ring |
| 33 | Rolling elements |
| 33a | End portion |
| 34 | Annular space |
| 35 | Recess on the end face |
| 36 | Groove |
| 37 | Pocket |
| 40 | Axial locking ring |
| 40a | Inner side |
| 41 | Recess on the axial locking ring |
| 42 | Radial groove |
| 43 | Inner edge |
| 44 | Axial groove |
| A | Axis of rotation of the tripod star (inner joint part) |
| B | Axis of rotation of the tripod housing (outer joint part) |
| Z | Pin axis |
| $l_w$ | Bearing width of the rolling element |
| $l_{IR}$ | Length of the inner peripheral surface of the inner ring in the axial direction |
| r | Radial direction |
| t | Depression |
| t1 | Depression of the opening into the annular space |
| t2 | Depression of the opening into the inner peripheral surface of the inner ring |

The invention claimed is:

1. A tripod roller for a tripod joint, comprising:

an outer ring comprising an outer ring circumference annular running surface, for rolling in a tripod housing, and an inner circumferential surface;

an inner ring comprising an inner ring circumference annular running surface for mounting on a pin of a tripod star and with an outer circumferential surface and end faces;

rolling elements configured in an annular space between the inner circumferential surface of the outer ring and the outer circumferential surface of the inner ring, wherein the outer ring is rotatably mounted on the outer circumferential surface of the inner ring;

axial locking rings, configured to be fixed to the outer ring to secure the outer ring axially relative to the inner ring, wherein the inner ring comprises recesses on at least one of the end faces for receiving lubricant, wherein the recesses are configured as grooves connecting the annular space of the rolling elements to the inner circumferential surface of the inner ring to supply the rolling elements with lubricant, wherein a contact length of the rolling elements is smaller in an axial direction than a length of the inner ring on the outer circumferential surface in the axial direction, and wherein a depression of the recesses at their respective openings into the annular space is smaller than a difference between the length of the inner ring and the contact length.

2. The tripod roller of claim 1, wherein the recesses are provided on both axial end faces of the inner ring.

3. The tripod roller of claim 2, wherein the depression of the recesses at their respective openings into the annular space is in each case smaller than half the difference between the length of the inner ring and the contact length.

4. The tripod roller of claim 1, wherein the end faces of the inner ring comprise recesses opening into the inner ring circumference annular running surface.

5. The tripod roller of claim 1, wherein the grooves are configured with a constant cross-section in the longitudinal direction of each respective groove.

6. A method for forming a tripod roller for a tripod joint, comprising:

providing an outer ring comprising an outer ring circumference annular running surface, for rolling in a tripod housing, and an inner circumferential surface;

providing an inner ring comprising an inner ring circumference annular running surface for mounting on a pin of a tripod star and with an outer circumferential surface and end faces, wherein the end faces comprise recesses opening into the inner circumferential surface of the inner ring;

configuring rolling elements in an annular space between the inner circumferential surface of the outer ring and the outer circumferential surface of the inner ring, wherein the outer ring is rotatably mounted on the outer circumferential surface of the inner ring;

configuring axial locking rings to be fixed to the outer ring to secure the outer ring axially relative to the inner ring, wherein the inner ring comprises recesses on at least one of the end faces for receiving lubricant, wherein the recesses are configured as grooves connecting the annular space of the rolling elements to the inner circumferential surface of the inner ring to supply the rolling elements with lubricant, wherein a contact length of the rolling elements is smaller in an axial direction than a length of the inner ring on the outer circumferential surface in the axial direction, and wherein a depression of the recesses at their respective openings into the annular space is smaller than a difference between the length of the inner ring and the contact length.

7. The method of claim 6, wherein the grooves are configured to guide lubricant from the inner circumferential surface of the inner ring into the annular space of the rolling elements.

8. A tripod joint assembly, comprising:

a tripod star comprising radially projecting pins;

a tripod roller, mounted on each pin, the tripod roller comprising:

an outer ring comprising an outer ring circumference annular running surface, for rolling in a tripod housing, and an inner circumferential surface, an inner ring comprising an inner ring circumference annular running surface for mounting on a respective pin of the tripod star and with an outer circumferential surface and end faces, rolling elements configured in an annular space between the inner circumferential surface of the outer ring and the outer circumferential surface of the inner ring, wherein the outer ring is rotatably mounted on the outer circumferential surface of the inner ring;

axial locking rings, configured to be fixed to the outer ring to secure the outer ring axially relative to the inner ring, wherein the inner ring comprises recesses on at least one of the end faces for receiving lubricant, wherein a contact length of the rolling elements is smaller in an axial direction than a length of the inner ring on the outer circumferential surface in the axial direction, and wherein a depression of the recesses at their respective openings into the annular space is smaller than a difference between the length of the inner ring and the contact length, and a tripod housing comprising a pair of tracks for each tripod roller for guiding the annular running surface of the outer ring of a respective tripod roller.

* * * * *